United States Patent
Kucherovsky et al.

(10) Patent No.: US 6,379,835 B1
(45) Date of Patent: Apr. 30, 2002

(54) METHOD OF MAKING A THIN FILM BATTERY

(75) Inventors: Joseph S. Kucherovsky, Philadelphia, PA (US); George R. Simmons, Mentor, OH (US); James A. Miller, Stow, OH (US); Christopher F. Mlnarik, Cuyahoga Falls, OH (US)

(73) Assignee: Morgan Adhesives Company, Stow, OH (US)

(*) Notice: Subject to any disclaimer, the term of this patent is extended or adjusted under 35 U.S.C. 154(b) by 0 days.

(21) Appl. No.: 09/630,214

(22) Filed: Aug. 1, 2000

Related U.S. Application Data

(62) Division of application No. 09/228,839, filed on Jan. 12, 1999, now abandoned.

(51) Int. Cl.[7] ................................................ H01M 6/40
(52) U.S. Cl. ........................ 429/118; 429/119; 429/162; 427/58
(58) Field of Search ................................ 429/110, 116, 429/117, 118, 119, 162; 427/58, 96

(56) References Cited

U.S. PATENT DOCUMENTS

| | | | |
|---|---|---|---|
| 2,637,757 A | * | 5/1953 | Wilke |
| 2,817,697 A | * | 12/1957 | Chubb |
| 3,376,166 A | * | 4/1968 | Hruden |
| 3,563,804 A | * | 2/1971 | Garcin et al. |
| 3,655,449 A | * | 4/1972 | Yamamoto et al. |
| 3,784,414 A | | 1/1974 | Macaulay et al. |
| 3,889,357 A | | 6/1975 | Millard et al. |
| 4,064,288 A | | 12/1977 | Shah et al. ................... 427/58 |
| 4,105,807 A | | 8/1978 | Arora |
| 4,105,815 A | | 8/1978 | Buckler ...................... 429/152 |
| 4,277,974 A | | 7/1981 | Karr et al. |
| 4,455,358 A | * | 6/1984 | Graham et al. |
| 4,517,265 A | | 5/1985 | Belanger et al. ............ 429/217 |
| 4,608,279 A | * | 8/1986 | Schumm, Jr. |
| 4,624,045 A | | 11/1986 | Ishihara et al. |
| 4,666,576 A | | 5/1987 | Pliefke |
| 4,672,586 A | | 6/1987 | Shimohigashi et al. ...... 365/229 |
| 4,816,356 A | | 3/1989 | Balkanski |
| 4,936,924 A | | 6/1990 | Inuzuka ....................... 136/249 |
| 4,977,007 A | | 12/1990 | Kondo et al. ................. 428/76 |
| 4,983,497 A | | 1/1991 | Gilson et al. |
| 5,116,701 A | * | 5/1992 | Kalisz |
| 5,250,905 A | | 10/1993 | Kuo et al. ................... 324/435 |
| 5,260,161 A | | 11/1993 | Matsumura et al. ........ 430/161 |
| 5,279,641 A | | 1/1994 | Narisawa et al. ............. 75/353 |
| 5,338,625 A | | 8/1994 | Bates et al. |
| 5,339,024 A | | 8/1994 | Kuo et al. ................... 324/435 |

(List continued on next page.)

OTHER PUBLICATIONS

ME Magazine, Apr. 1980, pp. 31–35, Article entitled "Borrowing Materials For Batteries" by John C. Bittence, Senior Editor.

*Primary Examiner*—W. L. Walker
*Assistant Examiner*—David Sorkin
(74) *Attorney, Agent, or Firm*—Lee, Mann, Smith, McWilliams, Sweeney & Ohlson; Timothy J. Engling

(57) ABSTRACT

A flexible thin film battery including a film layer and a porous cathode deposited on a portion of a film and a porous anode deposited on a portion of the film, with an electrolyte and separator layer positioned between the porous anode and the porous cathode. The electrolyte is preferably dried so the battery is activated when liquid contacts the electrolyte and separator layer. In a preferred embodiment, water swellable particles are included in the cell. The film layers are least partially sealed around the edges, confining the anode, cathode, and electrolyte and separator layer. The method of producing such a battery preferably includes printing various inks in a pattern on a polymeric film.

14 Claims, 3 Drawing Sheets

U.S. PATENT DOCUMENTS

| | | |
|---|---|---|
| 5,396,177 A | 3/1995 | Kuo et al. ................... 324/435 |
| 5,411,592 A | 5/1995 | Ovshinsky et al. .......... 118/718 |
| 5,437,692 A | 8/1995 | Dasgupta et al. ........... 29/623.1 |
| 5,445,906 A | 8/1995 | Hobson et al. ............. 429/162 |
| 5,448,110 A | 9/1995 | Tuttle et al. ................. 257/723 |
| 5,512,147 A | 4/1996 | Bates et al. ............ 204/192.15 |
| 5,512,389 A | 4/1996 | Dasgupta et al. ........... 429/192 |
| 5,567,210 A | 10/1996 | Bates et al. ................ 29/623.5 |
| 5,596,278 A | 1/1997 | Lin ........................... 324/435 |
| 5,612,152 A | 3/1997 | Bates .......................... 429/152 |
| 5,622,652 A | 4/1997 | Kucherovsky et al. ...... 252/511 |
| 5,643,480 A | 7/1997 | Gustavsson et al. ........ 219/211 |
| 5,656,081 A | 8/1997 | Isen et al. ..................... 118/46 |
| 5,665,490 A | 9/1997 | Takeuchi et al. |
| 5,667,538 A | 9/1997 | Bailey ....................... 29/623.5 |
| 5,681,402 A | 10/1997 | Ichinose et al. ............. 136/256 |
| 5,731,105 A | 3/1998 | Fleischer et al. |
| 6,045,942 A * | 4/2000 | Miekka et al. |

* cited by examiner

METHOD OF MAKING A THIN FILM BATTERY

This application is a division of application Ser. No. 09/228,839, filed Jan. 12, 1999, now abandoned.

BACKGROUND OF THE INVENTION

The present invention relates to thin film batteries. More specifically, the invention is directed toward a flexible thin film battery that has porous electrodes and electrolyte between film layers. The preferred method of mass producing such a battery includes depositing aqueous and non-aqueous solvent inks or coatings in a pattern on a polymeric film layer.

Numerous methods of depositing materials on a substrate are known in the art, including variations of evaporation, chemical vapor deposition, physical vapor deposition, microwave plasma enhanced chemical vapor deposition, sputtering, spray coating, plasma spraying, or vacuum depositing metals. Printing with conductive inks onto polymeric film to make thin film batteries has been tried in the past with varying success. Manganese dioxide and zinc electrodes have been printed from aqueous solutions coating an entire sheet of film. The method of coating or printing in a pattern with a non-aqueous solvent ink or a coating with water swellable polymers on a film layer, such as a polyolefin, is not known to be disclosed as a method of making a thin film battery. A method of using multi-unit printing techniques to form components of a thin film battery in conjunction with converting equipment (besides printing, coating, and laminating) allows other operations to be performed in-line to form a flexible thin film battery or a device incorporating such as a significant component.

Thin, flat batteries have been known in the literature for more than twenty years, but we know of no successful commercial applications. Prior art flat batteries were relatively thick and inflexible. The usable life of such batteries has been too short for many applications. Also, the shelf life of thin film batteries tends to be shorter than other batteries. Also, physical and electrical contact of the cell components in a flat thin film battery has been a limitation in design, which can be overcome by confining the components and sealing film layers around them or by adding binders or adhesives to the components.

It has therefore been found beneficial to produce a flexible thin film battery that is versatile and inexpensive to mass produce. Printed disposable thin film batteries are well suited for low power and high volume applications because they offer adequate voltage, sufficient life, and low-cost solutions.

SUMMARY OF THE INVENTION

The invention may be described as a flexible thin film battery. The thin film battery includes a lower film layer, such as polyethylene, that extends beyond the internal components. A portion of the inner surface of the lower film layer preferably has a current collector, such as carbon, printed or coated on a portion of the film. Printed on the cathode current collector is a solvent-based cathode ink that preferably includes manganese dioxide ($MnO_2$), carbon, and a water-swellable polymer. Printed over or inserted on at least a portion of an electrode is an electrolyte-separator layer that preferably includes zinc chloride ($ZnCl_2$) and ammonium chloride ($NH_4Cl$) in a water-soluble film former. The electrolyte-separator layer is disposed to ensure complete physical and ionic contact with the anode and the cathode in the assembled battery.

An anode ink/coating may comprise an organic solvent carrier/binder with zinc particles (such as flakes) and particles of a water swellable polymer. The water swellable particles of the preferred anode expand and permit a greater surface area contact with the zinc in the coating. Expansion occurs when the swellable particles come into contact with liquid associated with the electrolyte. This greater contact area will prolong the life of the cell. The increased life of the battery is obtained using porous anodes and cathodes that have the maximum surface area. Porosity is significant in adding life to a thin film battery, whether it is a dry construction or a wet construction with a gelled electrolyte. Thin film coatings tend not to be porous, but porosity in the thinly applied electrodes is necessary for optimal functioning of the battery. A water swellable polymer can be used with a non-aqueous (organic) solvent-based electrode ink or coating to assist in achieving porosity. The water swellable polymer being a porosity enhancer provides a better life curve for the thin film battery.

The upper layer is a polymeric film, which has an edge that extends beyond the internal battery cell components. The upper layer is sealed around at least a portion of its edges to the lower film layer thereby confining the internal components. "Upper" and "lower" used in describing the film layers are not a necessity for proper function, but rather for ease of description.

The flexible thin film battery is a breakthrough in the usable life and the shelf life of such a battery. The flexible thin film battery can supply sufficient power for use with numerous devices, and it is versatile when connected in series (greater voltage) or parallel (greater current) to achieve certain desired characteristics. Higher voltage and longer life can be achieved by connecting thin film batteries in series or parallel. Batteries may be printed in mass on a flexible film substrate so that certain numbers and configurations of batteries or devices requiring batteries can be constructed. Interconnections and circuits can also be printed.

The preferred dehydrated state of the battery will be described as a "dry construction," which will be more fully described below as an option. The dry construction represents an electrolyte that is not in a liquid state that is subsequently activated when liquid comes into contact with the electrolyte. An electrolyte can be combined with a porous membrane, water soluble film, or other substances that function as a separator. An electrolyte composition can be printed and dried on a separator, which can be a nonwoven superabsorbant fabric. This dehydrated state allows for an extended shelf life. The application of a liquid to a battery having the optional dehydrated state activates the battery.

An alternate battery using this "dry construction" includes an encapsulated liquid that can be released by breaking the encapsulating receptacle. The released liquid activates the battery.

The preferred dry construction has the benefit of providing extended shelf life prior to the application of a liquid while providing maximum power output after liquid is applied.

The flexible thin film battery is environmentally friendly. The construction does not require the use of harmful components, such as mercury or cadmium. The level of acidity or alkalinity is near neutral, so the pH remains near seven. Contact with human skin will not cause injury to that person. The expended flexible thin film battery can be disposed in regular waste removal procedures.

The devices for which this technology can be used are extensive. Any device that requires relatively low power or a limited life may function with a thin film battery. The battery can be inexpensively mass produced so that it can be a disposable product. The low cost allows applications that previously were not cost effective. An example of such a device is a diaper with electronic wetness indicator, for which a concurrent application has been filed.

DETAILED DESCRIPTION OF THE INVENTION

Figure 1:
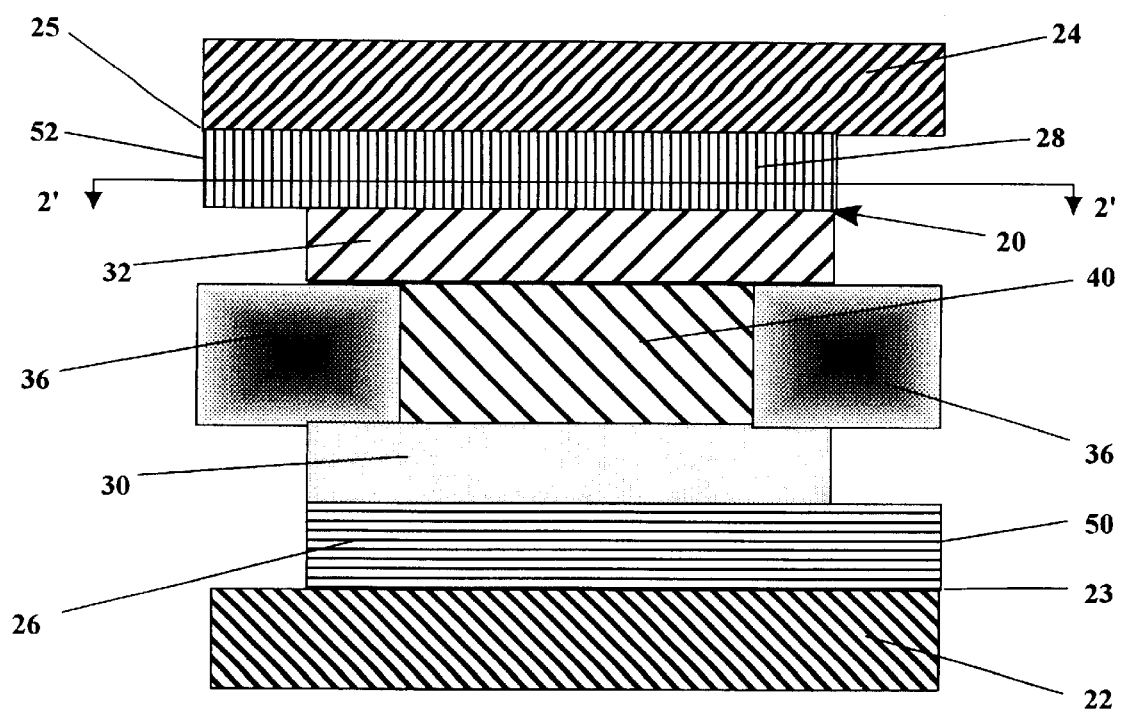
FIG. 1 shows a schematic side view of a stacked flexible thin film battery.

FIG. 1 shows a thin film battery 20 including a lower film layer 22, an upper film layer 24, a cathode current collector 26 on the lower film layer 22, an anode current collector 28 on the upper film layer 24, a cathode 30 associated with the cathode current collector 26, an anode 32 associated with the anode current collector 28, and an electrolyte-separator layer 40. The "cell" consists of electrodes 30 (cathode) and 32 (anode) with an electrolyte-separator layer 40 in physical and ionic contact with the electrodes 30 and 32.

Figure 2:
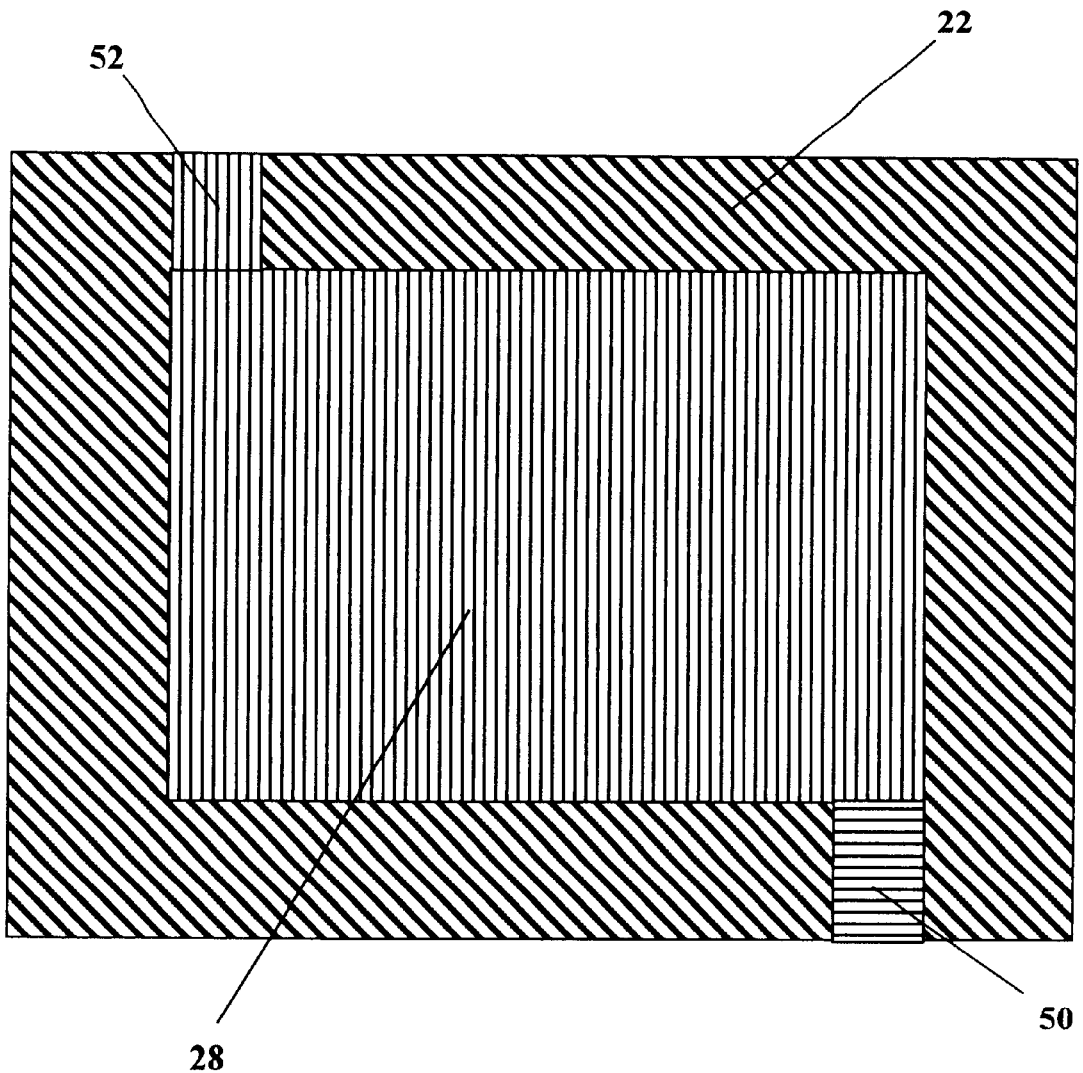
FIG. 2 is a top cutaway view of a flexible thin film battery taken along line 2'—2'.

The thickness of the entire thin film battery can range from 3 mils to 30 mils. As an example, the film layers 22 and 24 can each be approximately three mils thick, the anode 32 and cathode 30 can each be approximately three mils thick, while the electrolyte-separator layer 40 can be approximately 7 mils thick. The collectors 26 and 28 can each be approximately 1 mil thick. There are no thick metal foils required to be used in this printed battery. A preferred embodiment, as illustrated in FIG. 2, is a rectangular configuration having an area of about one quarter square inch to four square inches. Other configurations and sizes may be used depending on the application for which the battery is designed. The cell size affects the properties of the thin film battery. Higher voltage or longer life can be achieved by combining cells in series or parallel.

The film layers 22 and 24 can be numerous variations of polymeric film, either mono layer or multilayer films, such as polyester or polyethylene. Polyethylene is a preferred film because it provides flexibility in the battery. Such a film may be corona treated or coated with a pressure sensitive adhesive, as appropriate for specific applications. Polyester is also preferred because it provides improved strength permitting use of thinner gauge film and is not stretchable when used on a multilayer printing press. Polypropylene, vinyl, cellophane, and even paper can also be used as film layers.

In certain applications, the film layers 22 and 24 are permeable to gases, specifically hydrogen gas. Polyolefin films are known to be permeable to hydrogen gas. Such film layers 22 and 24 can let out gases produced in certain chemical reactions that energize the battery. Permeability to gas is important when hydrogen gas must be liberated from the cell so that the capacity, efficiency, and integrity of the battery 20 are not compromised. The release of hydrogen gas prevents separation between the layers of the cell or the entire battery 20.

The film layers 22 and 24 need not be the same on the upper and lower layers, but will depend on the performance criteria and design requirements of the cell. At least one of these film layers 22 and 24 must be receptive to printing or coating. The film layers 22 and 24 preferably can be sealed together by an adhesive, but alternate methods of adhering the films can be used, such as heat sealing and other types of laminating known in the art.

The lower film layer 22 and the upper film layer 24 extend beyond the internal cell components. The upper layer 24 is preferably a similar dimension as the lower film layer 22. The upper layer 24 is sealed around at least a section of its edges to the lower film layer 22 thereby confining the internal components.

A portion of the inner surface 23 of the lower film layer 22 preferably has a cathode current collector 26, such as carbon, printed or coated on a portion of the film 22. The cathode current collector 26 provides the conductive path from the cathode 30 to an electrical contact 50. Preferably, the cathode current collector 26 is applied as ink that is water or solvent based, with the choice being based on the desired properties of the ink and the production method used to apply the coating. An ink preferably includes conductive carbon black, a binder, and a carrier medium (water or solvent). Numerous other conductive inks can be printed as current collectors. An electrical contact 50 can be connected to the current collector 26.

Similarly, for the stacked or folded embodiments, the upper film layer 24 can be a film partially coated or printed with a current collector 28. In a side-by-side embodiment, the current collector 28 is deposited on the lower film layer 22. Preferably, the anode current collector 28 comprises a silver ink that is printed on a portion of the inner surface of a film layer 22 or 24. Preferably, the anode current collector 28 is applied as an ink that is water or solvent based, with the choice being based on the conductive properties of the ink and the production method used to apply the ink. The silver ink is preferably a silver-pigmented ink coating with a binder, and a carrier medium (water or solvent). An electrical contact 52 may be connected to the current collector 28.

Preferably, powders are made into inks and also printed as the cathode 30, the anode 32, and the electrolyte, which will be fully described below. Preferably, both the anode 32 and cathode 30 inks include a water swellable polymer to enhance porosity. Conventional inks and coatings tend not to be porous, which may limit the power of the cell or the life of the battery. Porosity in the thinly applied electrode inks is necessary for optimal functioning of the battery. A water swellable polymer can be used with a non-aqueous (organic) solvent-based electrode ink or coating to assist in achieving porosity. The water swellable polymer is a porosity enhancer that provides a better life curve for the thin film battery. Thus, the anode 32 and cathode 30 inks are preferably solvent based with a binder to accommodate water swellable polymers. The binder may be an acrylic resin or a vinyl resin or a mixture of both, and solvents found acceptable include alcohols and acetates.

The water swellable particles of the preferred cathode 30 and anode 32 expand and permit a greater surface area contact with the active components in the ink. An example of a water swellable polymer that has been found to be acceptable is modified starch, such as Water Lock sold by Grain Processing Corporation. Expansion occurs when the swellable particles come into contact with liquid associated with the electrolyte. This greater contact area will prolong the life of the cell. In the preferred embodiment of dry construction, swellable polymeric particles act to increase porosity when liquid is applied to the thin film battery that activates it. A swellable polymer will function with either a dry construction or with an electrolyte that is water based.

Porosity is significant in adding life to a thin film battery, whether it is a dry construction or a wet construction with a gelled electrolyte. The thin film battery with printed zinc-based and manganese dioxide-based electrodes with good porosity can achieve a life of 48 hours after activation if the battery has not passed its shelf life, which is extended with a dry construction. This cell performance of 48 hours has not been found in batteries made without porosity enhancement of the electrode inks.

Also, sodium polyacrylate has been acceptable as a water swellable polymer in certain applications, but it is not swellable in organic solvents. It is superabsorbant in water.

A cathode 30 is deposited on the cathode current collector 26 or film layer 22. The cathode 30 is preferably applied as a patterned ink or even a pliable coating. In one preferred embodiment, cathode 30 is printed from an ink including manganese dioxide ($MnO_2$), a binder polymer, carbon black (as a conductor), water-swellable polymer particles, and a carrier medium.

This printable ink cathode composition may comprise a manganese dioxide in about 55% by weight, a plasticizer of approximately 7.5% by weight, a carbon powder of approximately 5.5% by weight, and approximately 32% solvent or water as a carrier medium. The choice of the carrier medium depends on whether a water-swellable polymer is used in the cathode 30. The use of a solvent with water-swellable particles is preferred. A solvent that has been found acceptable is an active solvent such as a ketone, ester, or glycol ether. The binder is preferably a polymer that holds the manganese dioxide and carbon together, that provides film integrity, and that assists in adhering the coating to the film. A binder is, however, non-conductive and increases the impedance of the battery to a small extent by reducing electronic and ionic contact.

Other materials could be suitable for use as a cathode when used in conjunction with the appropriate anode including inorganic oxides, such as silver oxide and cuprous oxide, and reducible organic oxidizing compounds.

An acceptable anode 32 is an ink or a pliable coating including zinc particles and a carrier. This anode ink/coating preferably includes a printable vehicle with zinc particles (such as flakes) and an organic solvent carrier with a water swellable polymer. The water swellable particles of the preferred anode 32 expand and permit a greater surface area contact with the zinc in the coating. Expansion occurs when the swellable particles come into contact with liquid associated with the electrolyte. The carrier can be water if water-swellable particles are not used, but an organic solvent is preferred. The present invention may be suitable for use with alternate anode components, such as silver, magnesium, cadmium, and copper, preferably in combination with water swellable particles, when used with appropriate cathode components.

A dispersion with zinc particles in a binder that is either water-based or preferably solvent-based can be applied as an anode 28. The binder preferably serves several functions: to hold zinc particles together, to provide film integrity, and to provide adhesion to the support film.

An alternate anode 28 would be a zinc foil that is inserted in physical and ionic contact with the electrodes 30 and 32. This may eliminate the need for a current collector, but a foil element must be inserted. This alternative cannot be applied by a coating or ink, which is preferred to insertion of a foil.

Foil also affects flexibility and thickness. Metal foils are not required to be used in this printed battery, rather powders are preferably made into inks and coated on the film.

An electrolyte-separator layer 40 is deposited over or inserted on either cathode 30 or anode 32. The electrolyte-separator layer 40 is positioned between the anode 32 and cathode 30 so that it is in physical and ionic contact with both the anode 32 and cathode 30.

The electrolyte is a polar composition that provides the necessary ionic conductivity between the anode 32 and cathode 30. The electrolyte may contain inorganic salts that will ionize in a water solution. In a wet cell, the cell will operate if the electrolyte is added to the cell during assembly while it is kept from drying out by a seal 36 around the electrolyte separator layer 40 of the cell. In a preferred dry construction, the subsequent application of liquid activates the cell. The use of a water loving polymer as the separator ink allows the addition of ionic salt, which can be dried into an electrolyte-separator layer 40 that can be quickly rewet. The electrolyte in this preferred construction is in or coated on the electrodes or in or on the separator and dried. In one preferred embodiment, the electrolyte is applied as a zinc chloride ($ZnCl_2$) and ammonium chloride ($NH_4Cl$) ink composition in a water soluble film forming polymer. A zinc chloride, ammonium chloride, polyvinyl alcohol ink can be dried as the electrolyte-separator layer 40 for the dry construction for activation by the application of water.

The electrolyte-separator layer 40 can be an ink or applied coating that is printed over either the cathode 30 or anode 32. This coated electrolyte-separator 40 embodiment can include zinc chloride (27%), a binder or adhesive (55.6%), and Dualite balls (16.6%), or it can consist of a water solution of ZnCl and $NH_4Cl$ that has been gelled with a gelling agent. Dualite balls are small micro-spheres of a certain thickness that provide consistent separation, which results in a consistent distance between electrodes. Polyvinyl alcohol, which is a film forming polymer, can function as a separator medium.

Also, the electrolyte-separator layer 40 may be inserted between the printed film layers 22/30 and 24/32 on a porous membrane including a non-liquid electrolyte. The inserted separator is also porous. Ideally, in this embodiment, the electrolyte-separator layer 40 is a non-woven physical separator that separates the electrodes and that is impregnated with an electrolyte. A separator for a stacked or folded embodiment may also be constructed in a pattern with the electrolyte existing in cavities between the separator, for example the separator can be in a honeycomb pattern with either a liquid-based or preferably a dry construction electrolyte existing in the area between the hexagonal pattern.

The electrolyte-separator layer 40 maintains a distance between the anode 32 and cathode 30 to prevent the cell from shorting out. Also, the electrolyte-separator layer 40 provides the ionic conductivity between the anode 32 and cathode 30. The separator acts as an insulator, and it is porous so that an electrolyte can saturate it to provide ionic conductivity.

The electrolyte-separator layer 40 may contain an adhesive that holds the anode 32 and cathode 30 layers together, but keeps them separated. But in preferred constructions, such an adhesive is not needed to hold the anode 32 and cathode 30 together.

For a cell already activated with a water-based electrolyte, the film layers 22 and 24 cannot be water permeable. Water permeability will permit the electrolyte to dry out, shortening the life of the cell.

For a preferred dry construction battery, the film layers 22 or 24 can be water permeable, which may be a suitable means for passage of liquid to the electrolyte-separator layer of the cell. But permeability of standard film is probably too slow to permit exclusive use of this means for passage of liquid to the dry cell. Films may be perforated. Some mechanism or passage must be incorporated into the battery to insure adequate liquid transmission from outside the cell to the electrolyte-separator layer 40. This mechanism may differ depending on application.

A physical means for passage of liquid to the electrolyte-separator layer 40 of the cell is preferred. A means for passage includes an aperture in the film or any such opening in the film, or gaps in the seal around the cell perimeter that permit liquid to reach the electrolyte-separator layer 40. A means for passage of liquid includes any aperture, breach, break, burrow, cavity, crack, cranny, entrance, gap, hole, orifice, opening, perforation, puncture, rip, shaft, slit, slot, space, tear, tunnel, void or equivalent thereof known or yet to be known. Also, a means for passage of liquid includes breaking or crushing a fluid-filled container that is incorporated into the thin film battery, which releases liquid that reaches the electrolyte-separator layer 40 of the cell.

As noted above, the electrolyte-separator layer 40 may contain an ionically conductive adhesive as necessary. Preferably, a thin film battery 20 is small enough so that no adhesive is necessary. For example, it has been found that thin film batteries of less than three inches will not have problems with separation of the anode 32 and cathode 30, which would render the battery less effective. The seal 36 between the lower and upper film layers 22 and 24, which extends beyond the outer diameter of the internal components, is sufficient to hold the internal cell components in their proper position. If a more formidable battery is required, and the preferred use of smaller batteries in combination is not used, then an adhesive can be used with the electrolyte-separator layer 40, or the cell components can be patterned so that the lower and upper film layers 22 and 24 can be sealed together, such as a doughnut shape with an additional seal in the center (not shown). The coatings can be otherwise patterned so that an area can be reserved to adhere the two opposing outer film layers together.

Figure 3:
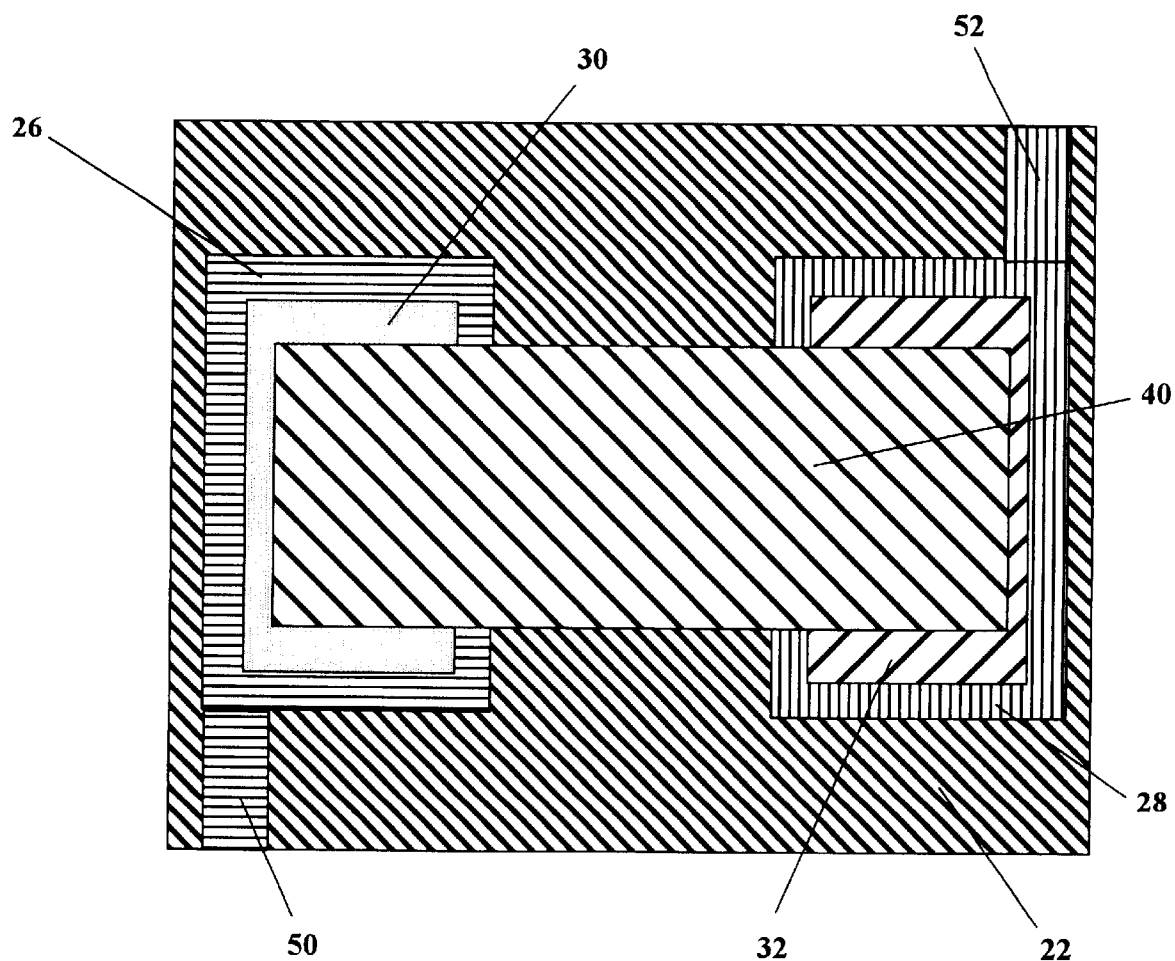
FIG. 3 is a component of a flexible thin film battery with a side-by-side cell.

The electrode inks can be printed in a side-by-side orientation as shown in FIG. 3. FIG. 3 is a preliminary stage in the construction of a flexible thin film battery with a side-by-side cell shown without an upper film layer. The current collectors 26 and 28, electrodes 30 and 32, and the electrolyte-separator layer 40 are deposited on only the lower film layer 22. There are two embodiments that can use this construction. An upper film layer 24 (not shown), such as a pressure sensitive adhesive film, can be laminated over this construction. Such upper film layer 24 need have no printed components, and upper film layer 24 can readily incorporate a means for passage of liquid. Upper film layer 24 can also be formed by a printing process incorporating a void pattern enabling access to electrolyte-separator layer 40. Also, the construction of FIG. 3 can be folded between the anode 32 and cathode 30 so that the resulting cell will be stacked.

The methods of producing a thin film battery are numerous depending on the desired result. The basics of a preferred method begin with an aqueous ink current collector being rapidly printed on a flexible support film. The next step involves printing porous electrode inks in register with the current collectors. In a side-by-side orientation, the electrodes are printed on a single layer in sequence. In a stacked or folded embodiment, an electrode may be printed on each film layer. The separator/electrolyte ink is then deposited over an electrode. The porous electrolyte-separator layer can be deposited on either printed film, or the electrolyte-separator layer can be inserted as a separate solid component between the film layers, which may be combined or folded over the electrolyte-separator so that the electrolyte-separator layer is between the anode and cathode.

In a preferred method, each layer of the cell is applied in a pattern by printing an ink that dries. A suitable method of producing a thin film battery begins with a polymeric film. A cathode current collector could be printed on a portion of the film layer where the cathode is to be deposited, and an anode current collector could be coated on the portion upon which the anode is to be deposited.

In a preferred method, a cathode ink, preferably including manganese dioxide and carbon, can be printed as a solvent solution and dried on the polymeric film, preferably over the film's current collector coating, to form a porous electrode. An anode, preferably including zinc particles, is also applied as a solvent ink on a different portion of the film and allowed to dry. Preferably, these coatings further include a non-aqueous solvent, a binder, and a water swellable polymer.

An electrolyte can be printed on either electrode or inserted as a solid. For the liquid-activated battery, an electrolyte and separator layer can be deposited on either electrode or on both electrodes in the side-by-side embodiment. A coating of zinc chloride solution with micro-spheres or a coating of zinc chloride and ammonium chloride in a water-soluble film form can be deposited and dried. Alternately, a porous membrane with a non-liquid electrolyte embedded in the membrane can be inserted to provide physical and ionic contact between the anode and cathode when the battery is complete.

For a battery adapted to activate when liquid contacts the electrolyte, a means for passage of liquid to the electrolyte must be incorporated into the battery. A means for passage could be provided by punching an aperture in the film or forming any such opening in or between the film. In a side-by-side embodiment, the upper film layer can be numerous water permeable films. Also, a breakable container holding liquid can be inserted into the thin film battery.

Either two distinct films or folded film layers are sealed at least partially around the edges thereby confining the electrodes and electrolyte. The seal may only be partial because gaps in the seal around the cell perimeter may permit liquid to reach the electrolyte-separator layer 40.

An upper film layer can be laminated over a side-by-side construction in line with the printing process. Components for devices can also be inserted in the process as expanded.

Typically, numerous thin film batteries would be printed on a continuing substrate. This substrate can be die cut to produce battery labels that can be adapted for high speed dispensing. Such battery "labels" can be economically applied to high volume applications.

As part of this method, connectors can be printed between multiple cells so that the batteries can be used in parallel or in series. Terminals and connectors can be printed to form multiple cells in series or parallel.

The process of producing a thin film battery using multi unit printing methods is designed to be expanded to produce an inexpensive electrical device with an internal power source. Most electrical components of the thin film battery will be made by printing special inks on a multi unit printing machine. Electrical circuits consist of some basic elements, most of which can be produced by applying special inks in a proper pattern and in sequence on a multi unit printing press. A power source or battery can be printed using inks that will form the basic parts: current collectors, electrodes, electrolytes, contacts, seals, etc. Wires, resistors, capacitors, coils, and switches can be printed by using conductive inks with different resistance, magnetic inks, and insulating inks. Diodes and transistors can be inserted or printed in-line allowing the production of complicated electrical circuits on a printing press. The advantages of this method detailed in the disclosure include: (1) high speed; (2) no manual labor; (3) no additionally required electrical contacts; (4) flexibility; and (5) light weight. With the use of conductive adhesives, many elements that cannot be printed at the present time can be inserted into the device.

Existing converting equipment (besides printing, coating, and laminating) allows other operations to be performed in-line, such as folding, die cutting, embossing, and inserting. For example, a battery, a capacitor, and a coil can be printed on a flexible film across the web, then folded and sealed together to achieve the desired properties. Thus, a circuit or device can be laid out, designed, and produced on a printing press with multiple units running at much higher speed than is possible with other methods.

Gravure printing is preferred because it allows for metering the thickness of the application of inks. Ink can be repeatedly applied to the desired thickness with the most constant and exact application. Another preferred method of applying ink is flexographic printing. Other methods are known to one of ordinary skill in the art that include rotary screen printing and letter press. The printing method is a function of the amount of ink required for the specific application.

Although the preferred embodiment of the invention is illustrated and described in connection with a particular type of cell, it can be adapted for use with a variety of anodes, cathodes, electrolytes, and current collectors. The manner in which cells are constructed can be governed by the choice of these materials.

Other embodiments and equivalent batteries and methods are envisioned within the scope of the invention. Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A method of producing a thin film battery adapted to activate when liquid contacts an electrolyte and separator layer, the method comprising the steps of:
   providing a polymeric film;
   printing on the polymeric film in a pattern solvent inks that include a water swellable polymer to form electrodes;
   depositing an electrolyte and separator layer in physical and ionic contact with the electrodes;
   providing a means for passage of liquid to the electrolyte and separator layer; and
   sealing the polymeric film on at least a section of its edges thereby confining the electrodes and electrolyte and separator layer.

2. The method of producing a thin film battery of claim 1 wherein the step of depositing an electrolyte and separator layer includes printing a coating of zinc chloride ink with micro-spheres and drying the zinc chloride ink.

3. The method of producing a thin film battery of claim 1 wherein the step of depositing an electrolyte and separator layer includes inserting a porous membrane with a non-liquid electrolyte embedded in the membrane.

4. The method of producing a thin film battery of claim 1 wherein the step of depositing an electrolyte and separator layer includes printing a zinc chloride, ammonium chloride, polyvinyl alcohol ink and drying the ink.

5. The method of producing a thin film battery of claim 1 including the additional step of printing a current collector on a portion of the polymeric film.

6. The method of producing a thin film battery of claim 1 wherein solvent inks are non-aqueous.

7. The method of producing a thin film battery of claim 1 including the additional step of adding a second film whereby the polymeric film is sealed on at least a section of its edges to the second film.

8. The method of producing a thin film battery of claim 7 wherein the second film is permeable to gas.

9. The method of producing a thin film battery of claim 7 wherein the second film is water permeable, thereby providing means for passage of liquid to the electrolyte and separator layer.

10. The method of producing a thin film battery of claim 7 wherein the means for passage of liquid to the electrolyte and separator layer is forming an aperture in the second film.

11. The method of producing a thin film battery of claim 1 wherein the step of depositing an electrolyte and separator layer in physical and ionic contact with the electrodes includes printing and drying an electrolyte composition on a separator.

12. The method of producing a thin film battery of claim 1 including the additional step of preparing solvent inks that include electrode powders.

13. The method of producing a thin film battery of claim 1 wherein the step of providing a means for passage of liquid is forming an aperture in the polymeric film.

14. The method of producing a thin film battery of claim 1 wherein the step of providing a means for passage of liquid includes leaving gaps in the seal around the edges of the polymeric film.

* * * * *